No. 11,822. Reissued Apr. 17, 1900.

M. COOPER, JR.

REFRIGERATING APPARATUS.

(Application filed Jan. 18, 1900.)

2 Sheets—Sheet 1.

Witnesses.
E. L. Crane
M. C. Cooley

Inventor
MADISON COOPER JR.
BY Paul & Hanley
HIS ATTORNEYS

No. 11,822. Reissued Apr. 17, 1900.

M. COOPER, JR.

REFRIGERATING APPARATUS.

(Application filed Jan. 18, 1900.)

2 Sheets—Sheet 2.

Witnesses:
E. S. Stone
M. E. Gooley

Inventor:
MADISON COOPER JR.
BY Paul H. Hawley
HIS ATTORNEYS

UNITED STATES PATENT OFFICE.

MADISON COOPER, JR., OF MINNEAPOLIS, MINNESOTA, ASSIGNOR OF ONE HALF TO GEORGE A. DOLE, OF SAME PLACE.

REFRIGERATING APPARATUS.

SPECIFICATION forming part of Reissued Letters Patent No. 11,822, dated April 17, 1900.

Original No. 629,341, dated July 25, 1899. Application for reissue filed January 18, 1900. Serial No. 1,955.

*To all whom it may concern:*

Be it known that I, MADISON COOPER, Jr., a citizen of the United States, residing at Minneapolis, in the county of Hennepin and State of Minnesota, have invented certain new and useful Improvements in Refrigerating Apparatus; and I do hereby declare the following to be a full, clear, and exact description of the invention, such as will enable others skilled in the art to which it appertains to make and use the same.

My invention relates to refrigerating apparatus, and has for its object to provide an improved system which shall be simple and cheap in point of construction and economical and efficient in point of operation.

To these ends my invention consists of the novel combination of devices hereinafter described, and defined in the claims.

The invention is illustrated in the accompanying drawings, wherein like notations refer to like parts throughout the several views.

Figures 1, 2:
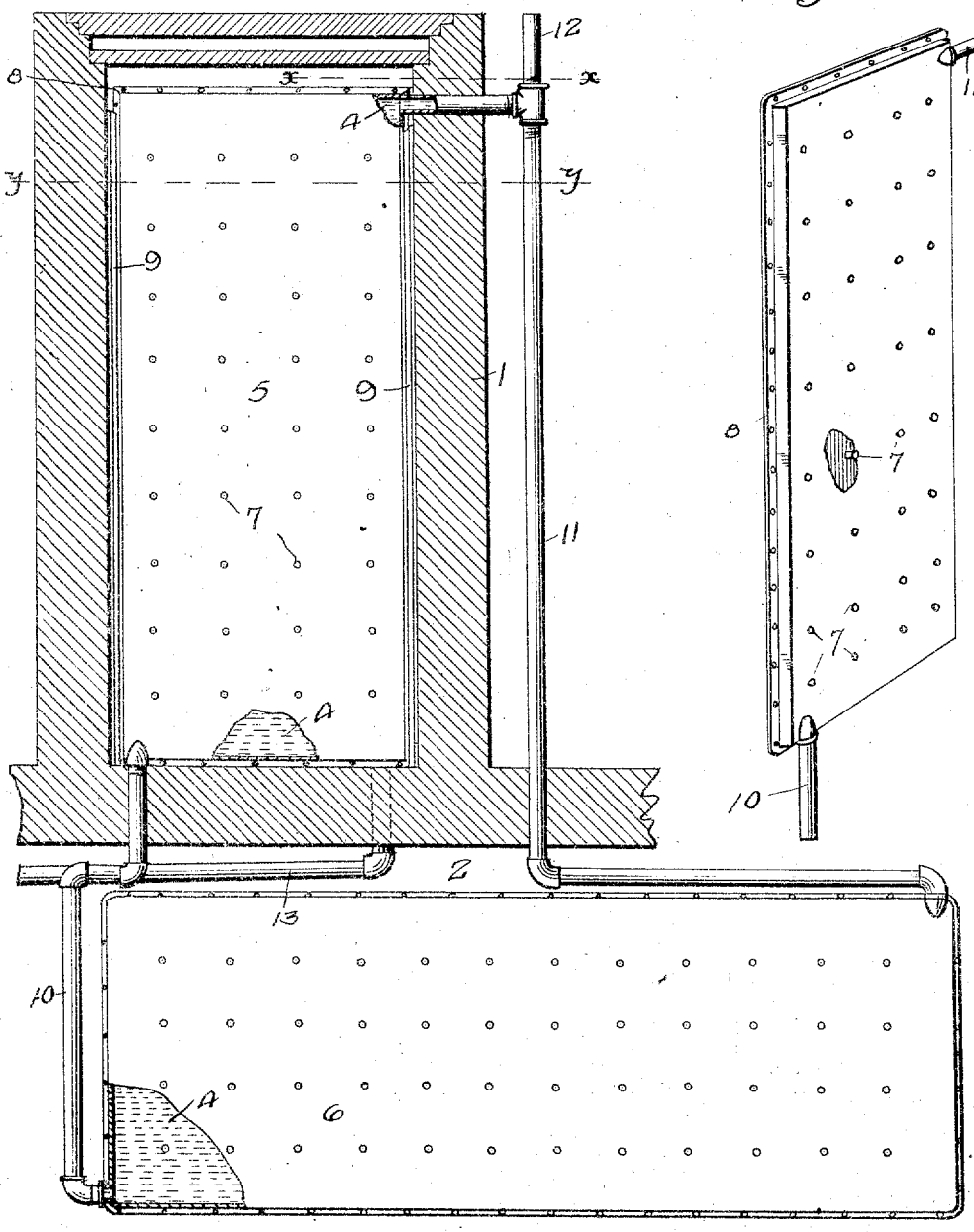
Figure 3:
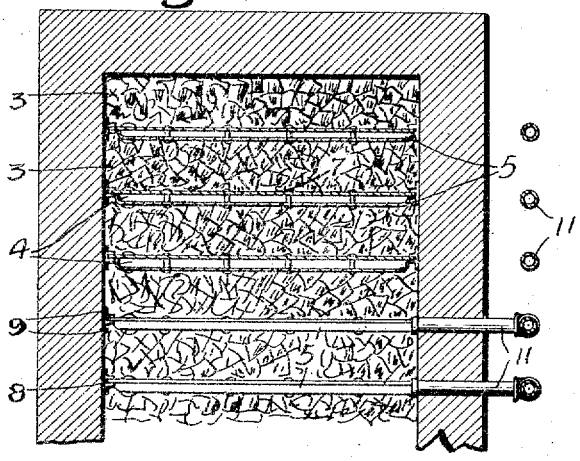
Figure 4:
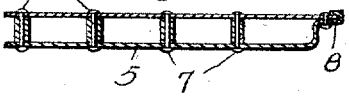
Figure 5:
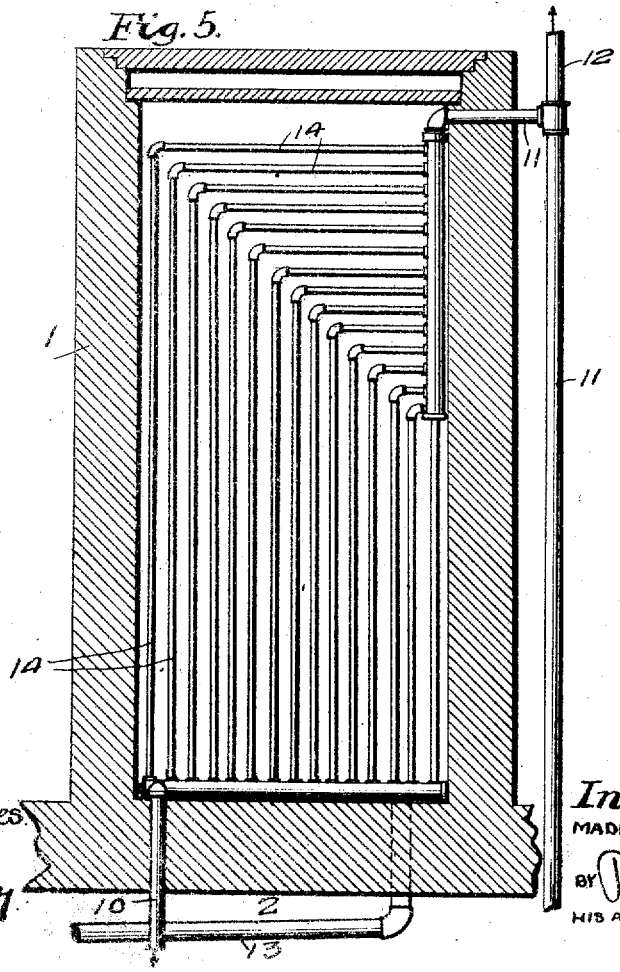

Figure 1 is a sectional elevation through the preferred form of my apparatus with some portions broken away. Fig. 2 is a detail in perspective showing one of the parts or sections of the circulating-circuit detached. Fig. 3 is a view in horizontal section, partly on the line *x x* and partly on the line *y y* of Fig. 1. Fig. 4 is a detail on a larger scale, showing in horizontal section one of the sections of the circulating-circuit on the line *y y* of Fig. 1; and Fig. 5 is a sectional elevation through part of an apparatus similar to that shown in Fig. 1, but having a modified form of circulating connection.

Directing attention first to the preferred form of my apparatus as illustrated in Figs. 1 to 4, inclusive, the numeral 1 represents a suitable tank or receptacle for the application of the primary refrigerant to the secondary or circulating refrigerant. The said tank 1 is located at a higher level than the medium, such as the air in a storage or other room 2, which is intended to be cooled. The primary refrigerant 3 may be a mixture of salt and ice, as shown in Fig. 3, or may be of any other suitable freezing mixture adapted to produce the cold desired. The secondary or circulating refrigerant 4 may be ordinary brine or any other suitable non-freezable liquid. This secondary refrigerant circulates through an endless circuit, the upper part of which circulating-circuit is subject to the primary refrigerant 3 within the tank 1 and the lower portion of which circulating-circuit is exposed within the medium intended to be cooled thereby—as the air, for example—in the storage or other room 2 at a lower level than the tank 1. This circulating-circuit may take any suitable form adapted to the purpose, but should preferably have extended surfaces in its upper portion subject to the refrigerant in the tank 1 and extended surfaces in its lower portion applied to cool the air or other surrounding medium, such as water, to which the cold is intended to be applied. In the preferred form of my apparatus I provide a circulating-circuit having upper sections 5 and lower or cooling sections 6 made up of sheet metal into the form of thin shells or hollow slabs. The side walls of these cells 5 and 6 are shown as connected by stay-rivets 7 for giving to the same the requisite strength. The upper shells or sections 5 are provided with marginal flanges 8, which work between the lips of suitable guide-lugs 9, fixed to the interior walls of the tank 1. These guides 9 are so disposed as to permit the said upper shells 5 to be inserted in and removed from working position endwise and to hold the same properly spaced apart from each other within the tank 1 for the proper application of the refrigerant or freezing mixture 3, as best shown in Fig. 3. The lower shells or cooling-surfaces 6 are exposed within the air or other medium to be cooled in any suitable way. For example, they are shown set edgewise within the storage-room 2 for cooling the air. A pipe-section 10 connects the lower end of each upper section 5 to the lower end of a coöperating cooling-section or shell 6 at the lower level, and a pipe-section 11 connects the opposite and highest end of said cooling section or shell 6 to the highest point of the upper section or shell 5 most remote from the outlet-pipe 10. The pipe-section 11 is also shown as provided with an extension 12, extending upward beyond the level at which the pipe 11 taps the shell 5 on the outside of the tank 1 to provide space for the expansion and contraction of the brine or circulating liquid 4 within the circulating-circuit. The walls of the tank 1 should of course be composed of suitable heat-insulating material, and said tank should also be provided with a suitable drip-pipe 13 for leading off the waste liquid from the freezing mixture to any point desired.

With the apparatus above described it is obvious that the secondary or circulating refrigerant 4 will circulate under the action of gravity. It is also obvious that a multiplicity of independent circuits for said secondary refrigerant 4 are provided, all of which have the largely-extended surfaces afforded by the shells 5 at the upper level subject to the action of the primary refrigerant 3 within the tank 1 and all of which have largely-extended cooling-surfaces afforded by the shells 6 exposed at the lower level for cooling the air or other surrounding medium desired. These independent circulating-circuits are a convenience in point of simplicity of construction and ready adaptation to a variation in capacity according to the requirements of the case and are also an advantage for the better action of the apparatus in that the circulation may be more or less rapid in the different circuits, according to the amount of heat absorbed from the surrounding media by the cooling-surfaces or shells 6.

The circulating-circuits may be filled with the brine or other non-freezing liquid 4 once for all, and the same will last for an indefinite period, as the only loss would be from leakage. Hence after the apparatus is set in operation it is only necessary to maintain the supply of ice and salt or other suitable freezing mixture for action as the primary refrigerant 3 within the tank 1. It must be obvious, therefore, that in localities where ice is abundant and cheap the above-described apparatus affords a comparatively-economical system for cooling purposes.

In all respects except as to the form of the surfaces of the circulating-circuit subject, respectively, to the primary refrigerant within the tank 1 and exposed for cooling purposes at a lower level the form of apparatus shown in Fig. 5 is identical with the form already described with reference to Figs. 1 to 4, inclusive. In the form shown in Fig. 5 the said extended surfaces of the circulating-circuit within the tank 1 are afforded by pipe stacks or coils 14. Similar pipe stacks or coils could also be used for the cooling-surfaces exposed at the lower level in the same way as the shells 6 within the storage or other room 2 for cooling the air or other surrounding media.

By actual usage I have demonstrated the efficiency and the economy of the form of apparatus illustrated for such localities as the northwestern part of the United States—like Minnesota, Wisconsin, &c.—where natural ice is abundant and cheap.

It will be understood, of course, that the details of the apparatus might be varied in many ways without departing from the spirit of my invention.

The expression "independent circulating-circuits" as herein used indicates circuits that do not communicate with each other, but, on the contrary, permit the secondary refrigerating fluids to circulate independently therethrough.

What I claim, and desire to secure by Letters Patent of the United States, is as follows:

1. A refrigerating apparatus, comprising an elevated tank or receptacle for the application of the primary refrigerant, and a series or multiplicity of independent and non-communicating circulating-circuits for the secondary refrigerant, each circuit having an upper portion subject to the action of said primary refrigerant within said elevated tank, and a lower portion exposed at a lower level for cooling purposes, substantially as described.

2. A refrigerating apparatus comprising an elevated tank or receptacle containing a primary refrigerant, and an endless inclosed circulating-circuit extending through said tank and in direct contact with the primary refrigerant, and, at a lower level, through the room or inclosure to be cooled, and containing a secondary refrigerant that circulates by gravity through said inclosed circuit.

3. A refrigerating apparatus comprising a tank or receptacle containing a primary refrigerant consisting of salt and ice, and an endless inclosed circulating-circuit extending through said tank and in direct contact with the primary refrigerant and extending through the room or inclosure to be cooled, and containing a secondary refrigerant that circulates through said inclosed circuit.

In testimony whereof I have hereunto set my hand this 13th day of January, 1900.

MADISON COOPER, JR.

In presence of—
A. C. PAUL,
M. E. GOODLEY.